(12) United States Patent
Routon et al.

(10) Patent No.: US 11,306,856 B2
(45) Date of Patent: Apr. 19, 2022

(54) CONNECTION SYSTEM FOR PUSH JOINT VALVE AND FITTINGS

(71) Applicant: The Harrington Corporation, Lynchburg, VA (US)

(72) Inventors: Sean Brian Routon, Lynchburg, VA (US); John Preston Riordan, Lynchburg, VA (US); John Emmett Riordan, III, Lynchburg, VA (US)

(73) Assignee: THE HARRINGTON CORPORATION, Lynchburg, VA (US)

( * ) Notice: Subject to any disclaimer, the term of this patent is extended or adjusted under 35 U.S.C. 154(b) by 0 days.

(21) Appl. No.: 15/910,235

(22) Filed: Mar. 2, 2018

(65) Prior Publication Data

US 2018/0252350 A1 Sep. 6, 2018

Related U.S. Application Data

(60) Provisional application No. 62/466,116, filed on Mar. 2, 2017.

(51) Int. Cl.

| | |
|---|---|
| *F16L 47/18* | (2006.01) |
| *F16L 47/32* | (2006.01) |
| *F16L 23/036* | (2006.01) |
| *F16K 27/04* | (2006.01) |
| *F16K 3/00* | (2006.01) |
| *F16L 47/26* | (2006.01) |

(52) U.S. Cl.
CPC ............ *F16L 47/18* (2013.01); *F16K 27/044* (2013.01); *F16L 23/036* (2013.01); *F16L 47/32* (2013.01); *F16K 3/00* (2013.01); *F16L 47/265* (2013.01)

(58) Field of Classification Search
CPC . F16L 47/18; F16L 47/32; F16L 47/04; F16L 47/265; F16L 47/26; F16L 47/041; F16L 23/036; F16L 19/02; F16L 19/0206; F16L 19/0237; F16L 19/025; F16L 23/02; F16L 23/032; F16K 3/00; F16K 27/044
USPC ......... 137/876; 251/148, 143; 285/368, 412, 285/406
See application file for complete search history.

(56) References Cited

U.S. PATENT DOCUMENTS

| | | | | |
|---|---|---|---|---|
| 346,478 | A | * | 8/1886 | Holmes .................... F16L 27/04 285/266 |
| 1,309,146 | A | * | 7/1919 | Mann ..................... F16L 23/032 285/368 |
| 1,891,874 | A | * | 12/1932 | Elkins ...................... F16L 21/08 403/378 |

(Continued)

*Primary Examiner* — Craig J Price
*Assistant Examiner* — Andrew J Rost
(74) *Attorney, Agent, or Firm* — Nixon & Vanderhye P.C.

(57) ABSTRACT

A push joint adapter is connectable to one or more push joint pipe fittings in a pipeline. The push joint adapter includes an insertion section insertable into a socket of a push joint pipe fitting in an interference fit, a pipeline section connectable with the pipeline, and a collar disposed between the insertion section and the pipeline section. A restraint ring assembly cooperable with the push joint pipe fitting includes a restraint ring secured to the pipeline section and engaging the collar and a restraint rod connected to the restraint ring. The push joint adapter facilitates connecting push joint gasketed bell gate valves and fittings in a pipeline such as a polyethylene pipeline.

3 Claims, 9 Drawing Sheets

(56) References Cited

U.S. PATENT DOCUMENTS

| | | | | |
|---|---|---|---|---|
| 2,976,008 A * | 3/1961 | Ocker | ............... | F16K 27/044 251/175 |
| 3,191,969 A * | 6/1965 | Wrenshall | ............... | 285/24 |
| 3,659,877 A * | 5/1972 | Kubasta | ............... | F16B 31/021 285/3 |
| 4,181,332 A * | 1/1980 | Neumann | ............... | F01N 13/1811 285/179 |
| 4,429,903 A * | 2/1984 | Baker | ............... | F16K 27/00 285/24 |
| 4,649,614 A * | 3/1987 | Lund | ............... | F01N 13/1805 29/257 |
| 5,190,324 A * | 3/1993 | Bird | ............... | F16L 21/08 285/328 |
| 5,468,025 A * | 11/1995 | Adinolfe | ............... | F16L 21/08 285/114 |
| 5,509,699 A * | 4/1996 | Himmelberger | ............... | F16L 23/024 285/321 |
| 5,863,080 A * | 1/1999 | Svetlik | ............... | F16L 21/08 285/148.13 |
| 6,056,330 A * | 5/2000 | Compton | ............... | F16L 19/0206 285/133.21 |
| 6,065,784 A * | 5/2000 | Lundstrom | ............... | F16L 47/12 285/368 |
| 6,139,068 A * | 10/2000 | Burress | ............... | F16L 19/005 285/114 |
| 6,253,791 B1 * | 7/2001 | Mikio | ............... | F16K 11/0873 137/625.47 |
| 8,096,591 B2 * | 1/2012 | Gentile, Jr. | ............... | F16L 23/032 285/12 |

\* cited by examiner

CONNECTION SYSTEM FOR PUSH JOINT VALVE AND FITTINGS

CROSS-REFERENCES TO RELATED APPLICATIONS

This application claims the benefit of U.S. Provisional Patent Application No. 62/466,116, filed Mar. 2, 2017, the entire content of which is herein incorporated by reference.

STATEMENT REGARDING FEDERALLY SPONSORED RESEARCH OR DEVELOPMENT (NOT APPLICABLE)

BACKGROUND

The invention relates to a push joint adapter and, more particularly, to a push joint adapter that conveniently connects push joint gasketed bell gate valves and fittings in a polyethylene (PE) pipeline.

Gasketed bell gate valves are normally used on PVC pipe in common usage in typical irrigation systems. Normally, gate valves with mechanical joint ends or flanged ends are used in PE pipelines with PE adapters and metal rings accompanied by a gasket and a number of bolts to "make" the joint requiring careful and high torqueing and re-torqueing after a long wait time. Reliance on high torqueing while sandwiching a plastic flange offered by mechanical joint and flange adapters can be problematic as the plastic creeps under high bearing load causing the bolts to lose their preload, resulting in a potential leak risk. With all of these metal components in the existing connections, especially bolts and nuts, the connections are relatively exposed to corrosion. Mechanical joint and flanged valves are not normally carried by irrigation distribution.

Existing PE adapters typically include an internal metal stiffener at a location where a mechanical joint connection is made in order to assure the seal. Without the stiffener, the act of compressing the mechanical joint gasket subjects the PE tube to high stress resulting in deformation that prevents a reliable seal.

BRIEF SUMMARY

The PE adapters according to the described embodiments are fused to the piping in which it is used. The adapters do not require a metal stiffener because the push joint gasket is a controlled displacement seal with a soft rubber gasket that limits the forces applied to the PE tube. The adapters of the described embodiments does not utilize bolts and nuts that require high torque and preload of the plastic flange.

In an exemplary embodiment, a push joint adapter is connectable to one or more push joint pipe fittings in a pipeline. The push joint adapter includes an insertion section insertable into a socket of a push joint pipe fitting in an interference fit, a pipeline section connectable with the pipeline, and a collar disposed between the insertion section and the pipeline section. A restraint ring assembly cooperable with the push joint pipe fitting includes a restraint ring secured to the pipeline section and engaging the collar and a restraint rod connected to the restraint ring.

The restraint ring may include a pair of ring halves connectable at respective ends on opposite sides of the pipeline section. The push joint adapter may include a pair of restraint rods, where each of the ring halves may include connector openings at the respective ends thereof, where the respective ends of the ring halves are overlaid over each other such that the connector openings are aligned, and where the restraint rods extend through the aligned connector openings. The restraint rods may be securable at distal ends to the push joint pipe fitting, and the restraint rods may be secured at proximal ends with a connector. The proximal ends of the restraint rods may be threaded such that the connector is a nut. In some embodiments, the restraint rods may include a hook or T-head at the distal ends.

The insertion section may be provided with a beveled end. The push joint adapter may be in the form of a tee fitting with three ends, each of the three ends being selectively configurable as the insertion section or the pipeline section.

An assembly for connecting an isolation valve in a pipeline may include a first push joint adapter and the isolation valve, where the isolation valve may include a first valve socket, and the insertion section may be secured in the first valve socket. The isolation valve may include a second valve socket, where the assembly further includes a second push joint adapter, and the insertion section of the second push joint adapter may be secured in the second valve socket. In some embodiments, a first restraint ring of the first push joint adapter may be connected to a second restraint ring of the second push joint adapter by a pair of the restraint rods.

In another exemplary embodiment, a combination of a push joint adapter connected to a push joint pipe fitting in a pipeline includes the push joint pipe fitting with a socket, and the push joint adapter.

The push joint pipe fitting may be an isolation valve having a first socket and a second socket, and the combination may include two of the push joint adapters respectively secured in the first and second sockets of the isolation valve. The restraint ring secured to the pipeline section of one of the two push joint adapters may be connected to the restraint ring secured to the pipeline section of the other of the two push joint adapters by the restraint rod.

The restraint ring assembly may include two restraint rods, and the push joint pipe fitting may include a tee fitting with a pair of rod tabs positioned on opposite sides of the socket, where the restraint rods may be connected to the rod tabs at the opposite ends of the restraint rods. The tee fitting may include three sockets, and the combination may further include three push joint adapters connected to the three sockets, respectively.

The combination may also include a reducer fitting having a connecting section connectable to the pipeline section or to the push joint pipe fitting and a reduced diameter section.

In yet another exemplary embodiment, a push joint adapter assembly is connectable to one or more push joint pipe fittings in a pipeline. The push joint adapter assembly includes a push joint adapter with the insertion section, the pipeline section, and the collar, and a restraint ring assembly cooperable with the push joint pipe fitting. The restraint ring assembly includes a restraint ring and a pair of restraint rods. The restraint ring is secured to the pipeline section and engages the collar. Proximal ends of the restraint rods may be extended through respective openings in the restraint ring and secured with nuts on an opposite side of the restraint ring from the collar. Distal ends of the restraint rods may be securable to the push joint pipe fitting.

BRIEF DESCRIPTION OF THE DRAWINGS

These and other aspects and advantages of the invention will be described in detail with reference to the accompanying drawings, in which.

DETAILED DESCRIPTION

FIGS. 1-4 show an exemplary application of the push joint adapter 10 according to the described embodiments coupled with a push joint isolation valve 12. The push joint isolation valve 12 is one of various push joint pipe fittings to which the push joint adapter 10 is applicable. For example, the push joint adapter 10 may be applied to the connection of a push joint valve individually in a polyethylene pipe system, "in-line" and removed from a fitting (and in particular a tee fitting).

The adapter may be applied to the use of push joint metallic fittings in a polyethylene pipe system. In this context, it would take one or more push joint adapters to connect the various possible fittings, e.g., one for a cap, two for an elbow, three for a tee and so on. In these two applications, the same polyethylene push joint adapter is used to connect either push joint valves or metallic push joint fittings. The insertion end connects to the valves or the fittings and the pipeline section is fused, generally by butt fusion or the like, to the piping. The benefits of the use of fittings and valves are mostly the same, except a user is more likely to use the valve application rather than the fitting application. The user is more likely to use plastic fittings which are typically butt fused to the PE pipe rather than metallic push joint fittings connected via push joint adapters into the PE pipe line.

The adapter may be applied to an ideal form where the features of the push joint adapter are integrated into the form of a plastic tee (on each end) and plastic reducers (on only the smaller end), where the plastic reducers may be fused to the plastic tee and in so doing made a part of a resulting plastic tee with reductions. All three ends of the plastic tee then present insertion ends (of the push joint adapter concept) that can either be connected to push joint valves (or other metallic push joint fittings for that matter but less likely) or the ends might be connected by fusion (usually butt fusion but there are other fusion types) to the plastic piping or other plastic fittings.

Figure 5:
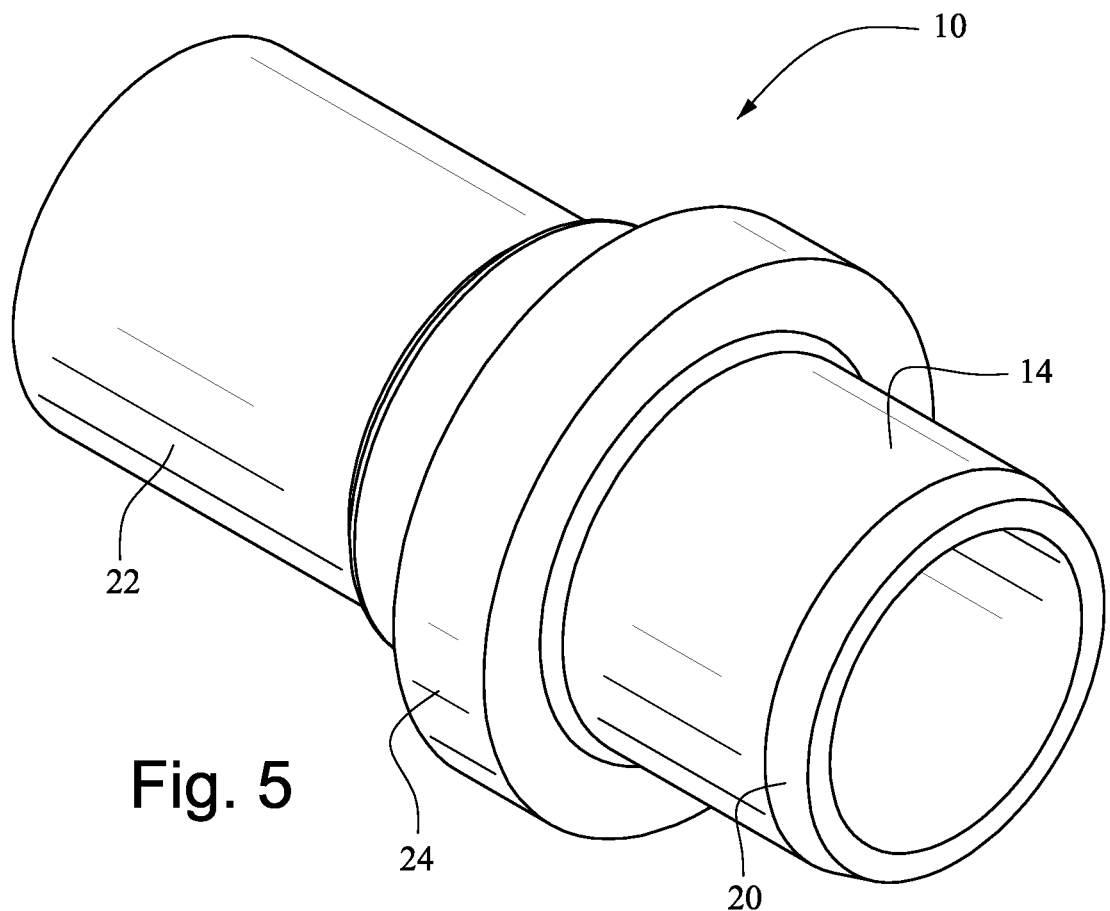
FIG. 5 is a perspective view of the push joint adapter.

FIG. 5 is a perspective view of the push joint adapter 10 separated from the isolation valve 12.

The push joint adapter 10 includes an insertion section 14 insertable into a socket 16 of a push joint pipe fitting, such as the isolation valve 12 shown in FIGS. 1-4. The socket 16 may be provided with a circumferential seal 18 on an inside diameter, and the push joint adapter 10 may be secured in the socket 16 and engaged with the seal 18 in an interference fit. The insertion section 14 may be provided with a beveled end 20 to facilitate insertion of the push joint adapter 10 into the gasket, and the seal 18 engages an outside diameter of the insertion section 14. A lubricant may be applied to facilitate insertion.

The adapter 10 may also be provided with a pipeline section 22 that is connectable with the PE pipeline. A collar 24 is positioned between the insertion section 14 and the pipeline section 22. The collar 24 is preferably an integral part of the push joint adapter 10. The form of the push joint adapter 10 may be manufactured by injection molding in one piece or by machining the entire push joint adapter form from "stock" that is typically extruded.

A restraint ring assembly 26 includes a restraint ring 28 secured to the pipeline section 22 and engaging the collar 24. One or more restraint rods 30 serve to secure the push joint adapter 10 via the restraint ring 28.

Figure 1:
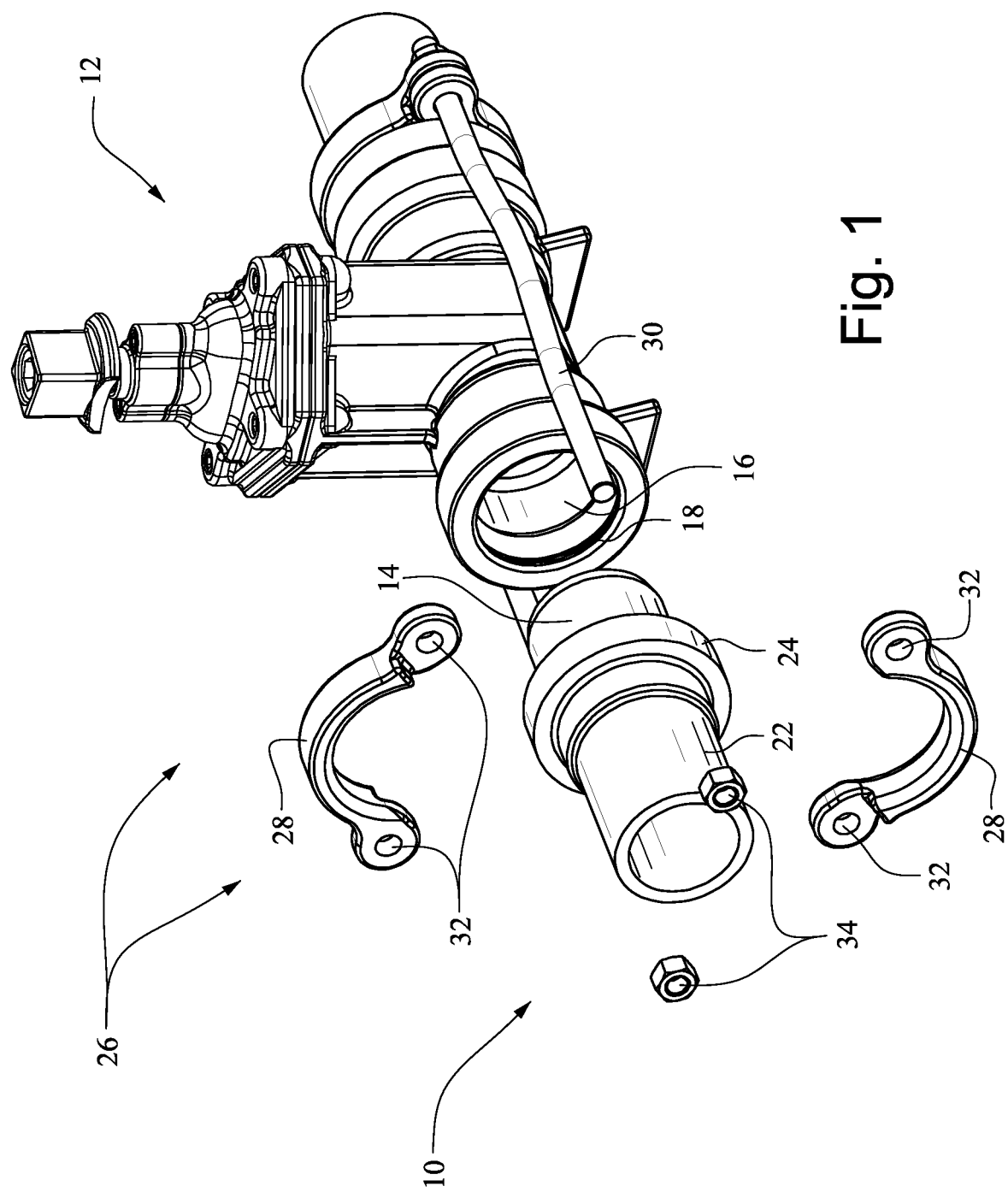
FIGS. 1-4 show a push joint adapter according to the described embodiments coupled with an isolation valve.

As shown in FIG. 1, in some embodiments, the restraint ring 28 includes a pair of ring halves connectable at respective ends on opposite sides of the pipeline section 22. The ring halves may be provided with connector openings 32 at respective ends thereof. The ends of the ring halves are overlaid over each other such that the connector openings 32 from one ring half are aligned with the connector openings 32 from the other ring half. The restraint ring 28 may also be formed as a single piece. The restraint rods 30 extend through the aligned connector openings 32. In some embodiments, at least the proximal ends of the restraint rods 30 are threaded, and the restraint rods 30 may be secured at the proximal ends with a suitable connector such as a nut 34. In some embodiments, additional restraint rods 30 may be included.

An opposite end (i.e., a distal end) of the restraint rods 30 may be secured to the restraint ring of another push joint adapter (as shown in FIG. 1) or may be secured directly to the pipe fitting. In the construction shown in FIGS. 1-4, the isolation valve 12 has first and second sockets that respectively receive first and second push joint adapters 10. In this construction, the restraint rods 30 are threaded at both ends, and the push joint adapters 10 are drawn towards each other in engagement with the isolation valve 12 by the threaded connectors 34. The restraint ring 28 engages the collar 24 on the push joint adapter 10, and the restraint rods 30 secure the push joint adapter 10 in the valves.

The restraint rods 30 in FIG. 1 span the valve and serve to transfer a thrust force from one side of the valve to the other. The load path goes through the valve end into the collar 24 and then into the restraint ring 28. The restraint rods 30 hold the valve 12 or other fitting in place.

Figure 1A:
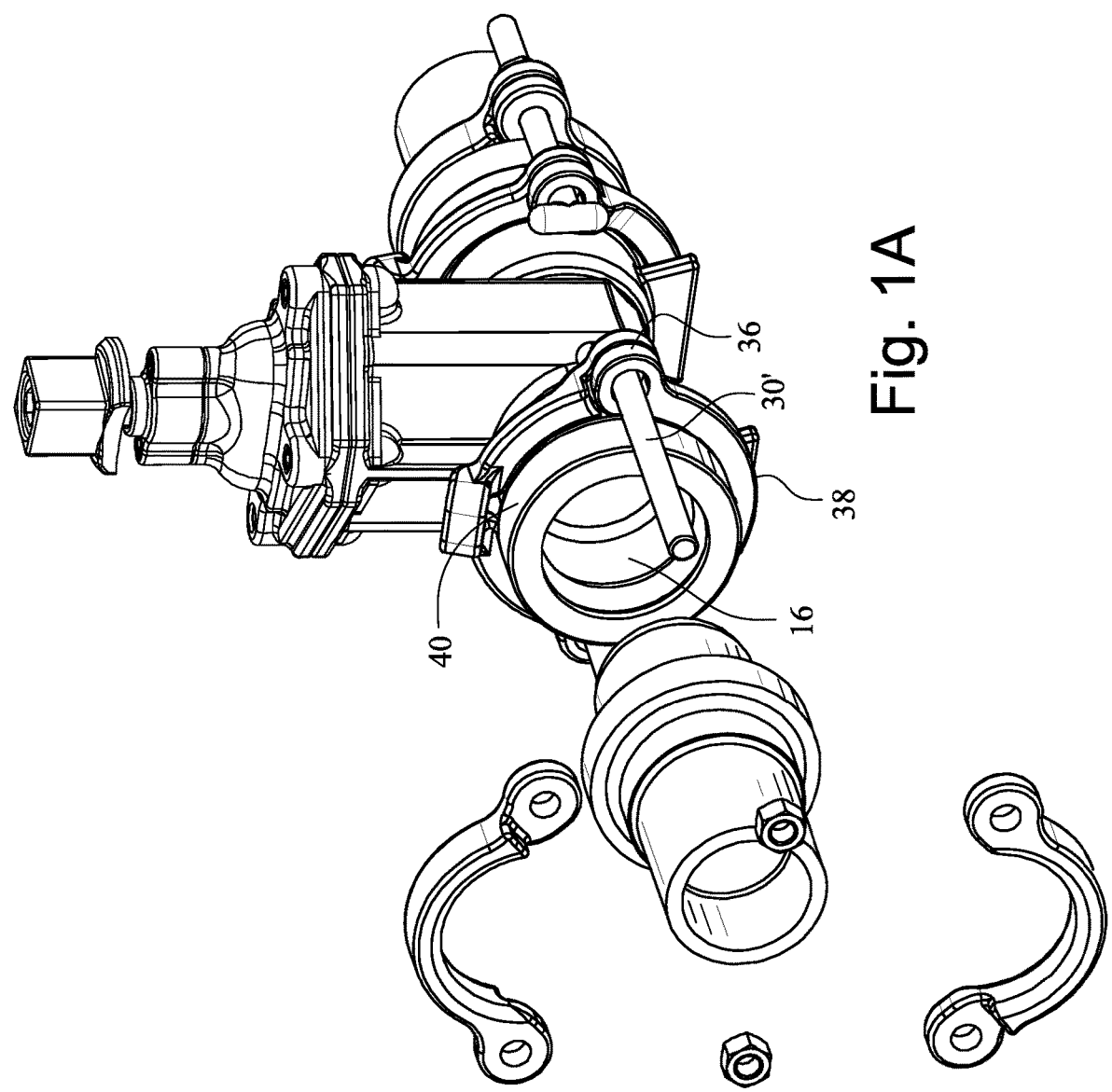
FIGS. 1A and 1B show variations with a modified restraint rod and a valve bell restraint ring.
Figure 1B:
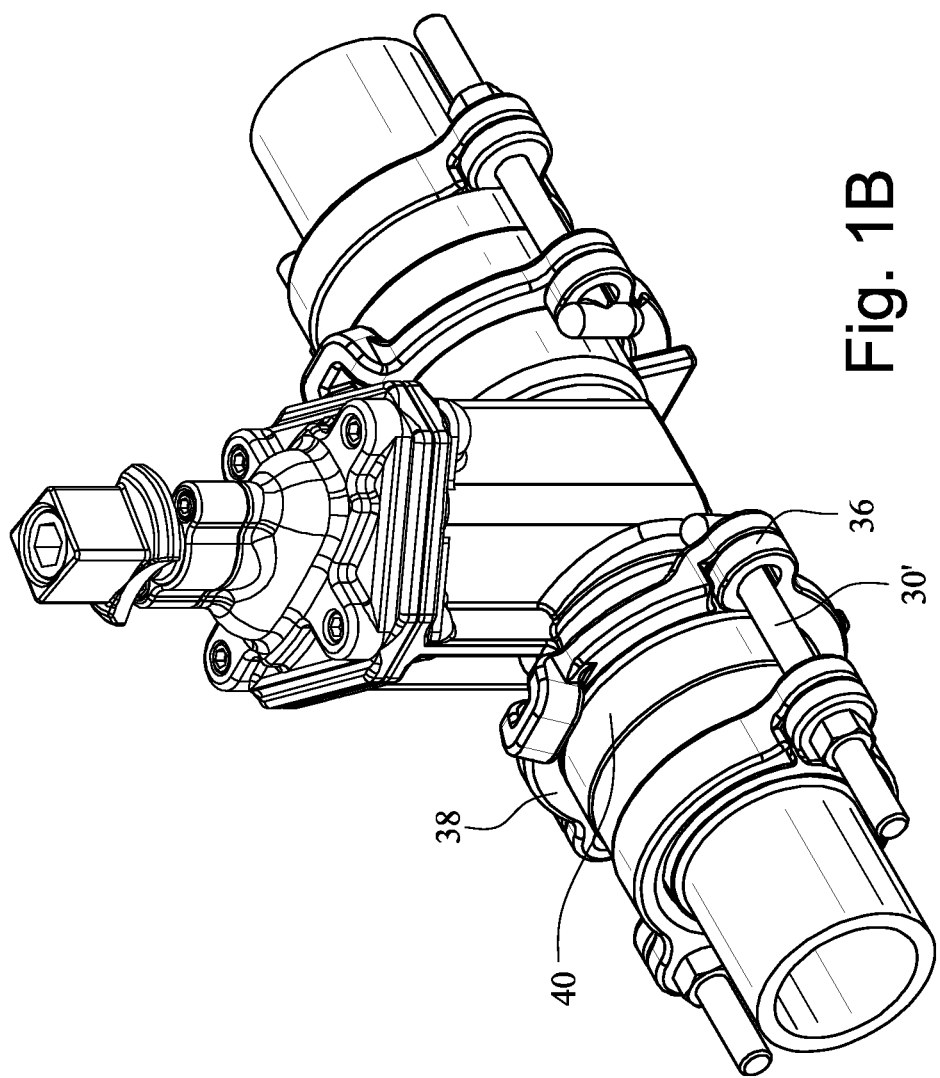

FIGS. 1A and 1B show an alternative construction where the valve is provided with a pair of rod tabs or openings 36, and the restraint rods comprise T-bolts 30' to engage the rod tabs or openings 36. In the exemplary construction shown in FIGS. 1A and 1B, the rod tabs or openings 36 may be secured on the outside diameter of the socket via a valve bell restraint ring 38. Like the restraint ring 28 shown in FIG. 1, the valve bell restraint ring 38 in FIG. 1A engages a collar 40 positioned adjacent the gate valve socket 16.

The use of metallic fittings in PE piping systems may be preferred to extend the life of the system as plastic fittings have reduced life compared to plastic pipe.

Figure 1C:
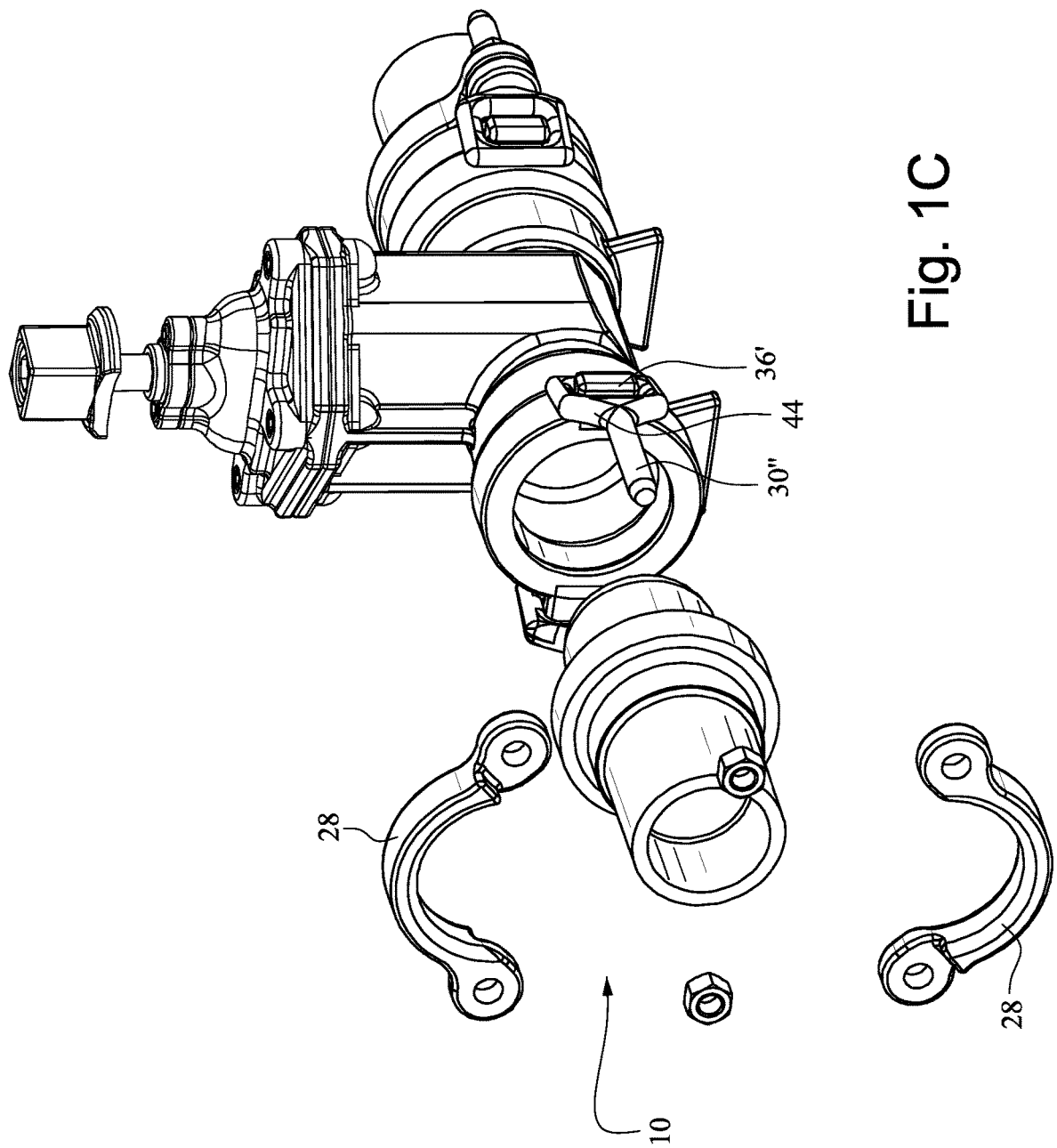
FIG. 1C shows a variation with a modified restraint rod and rod tabs or apertures.
Figure 2:
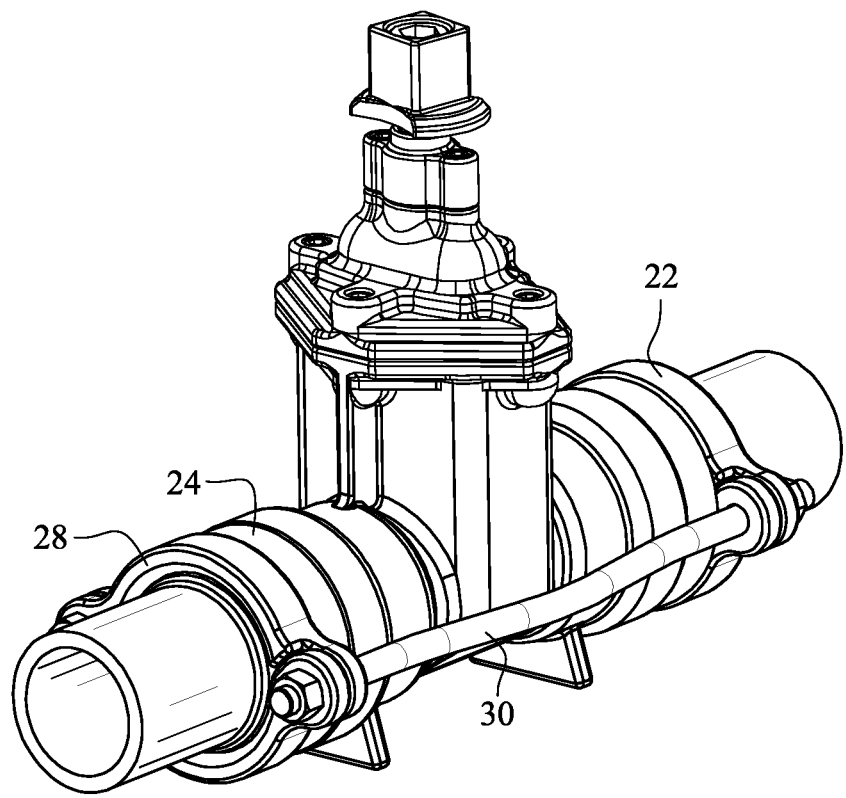
Figure 3:
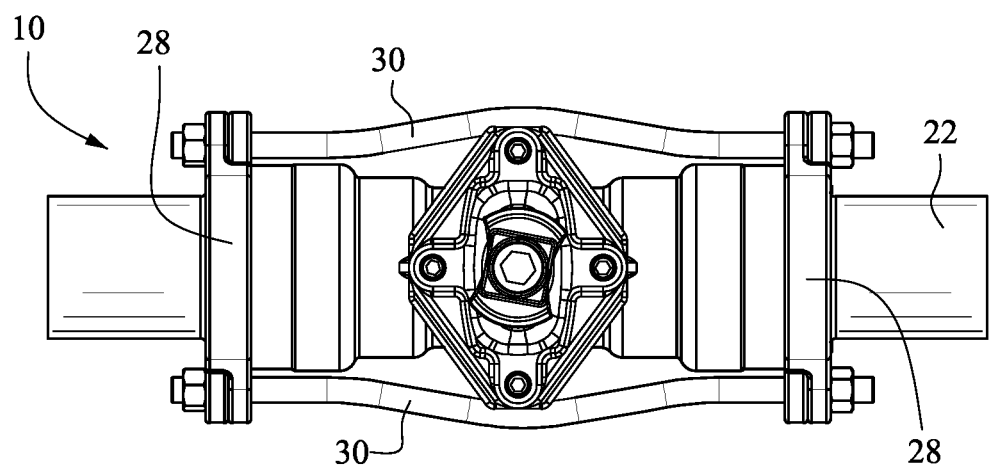
Figure 4:
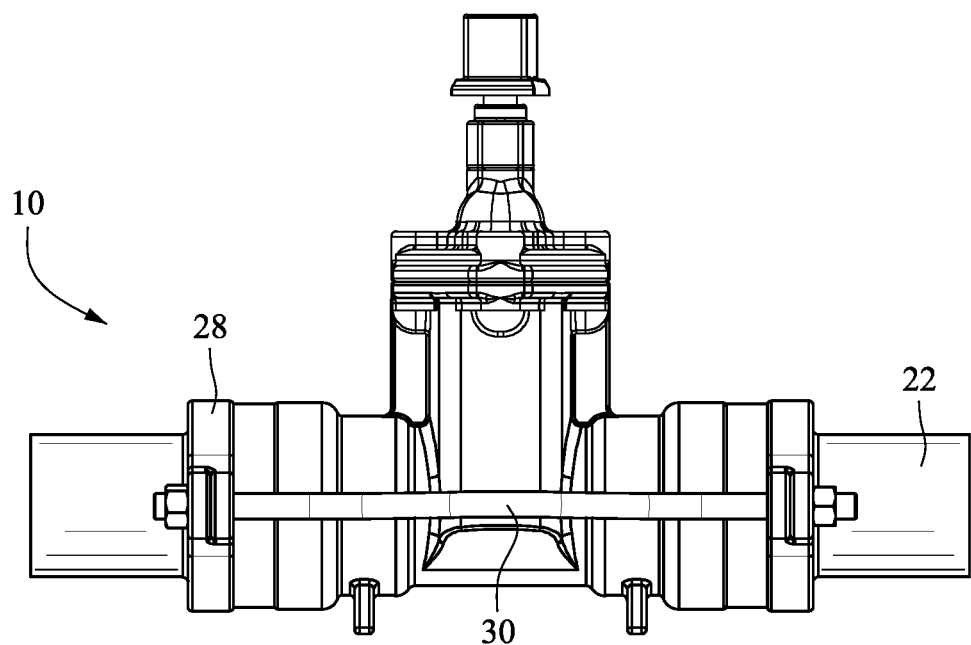
Figure 6:
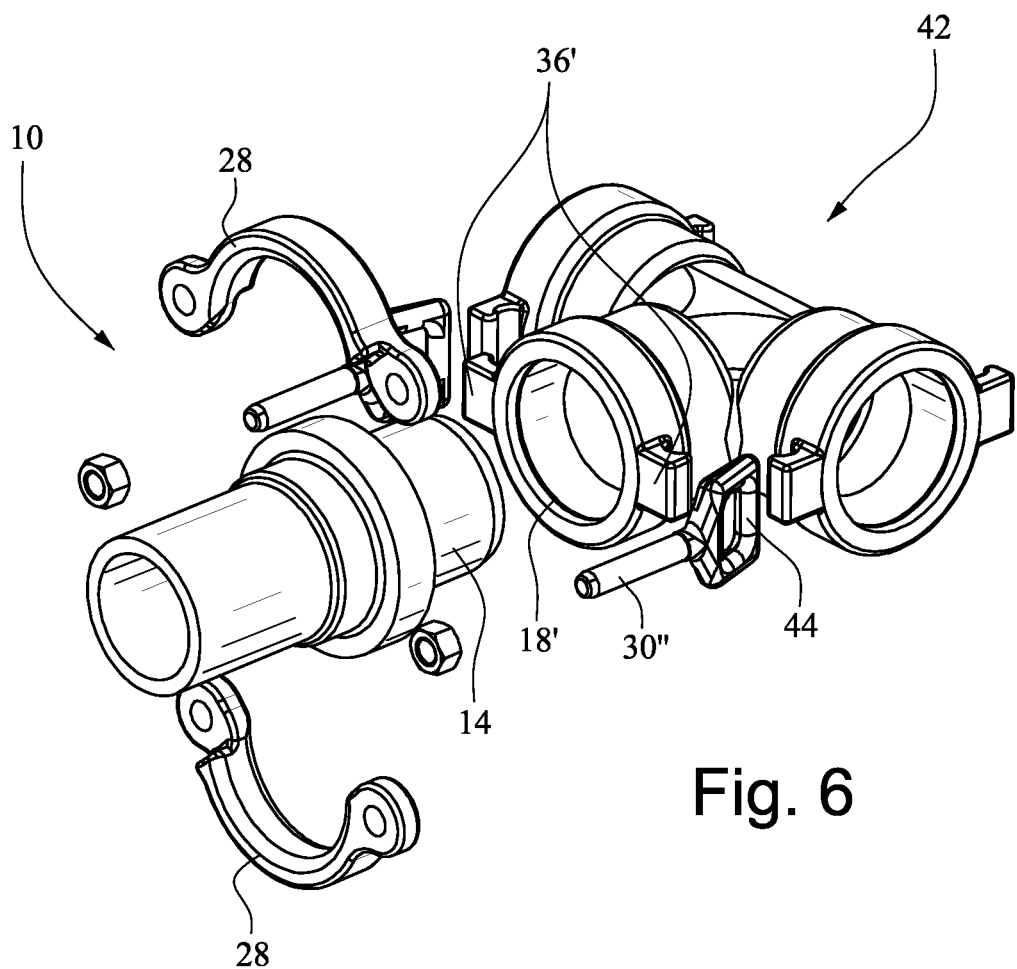
FIGS. 6 and 7 show the push joint adapter coupled with a metallic push joint tee fitting.
Figure 7:
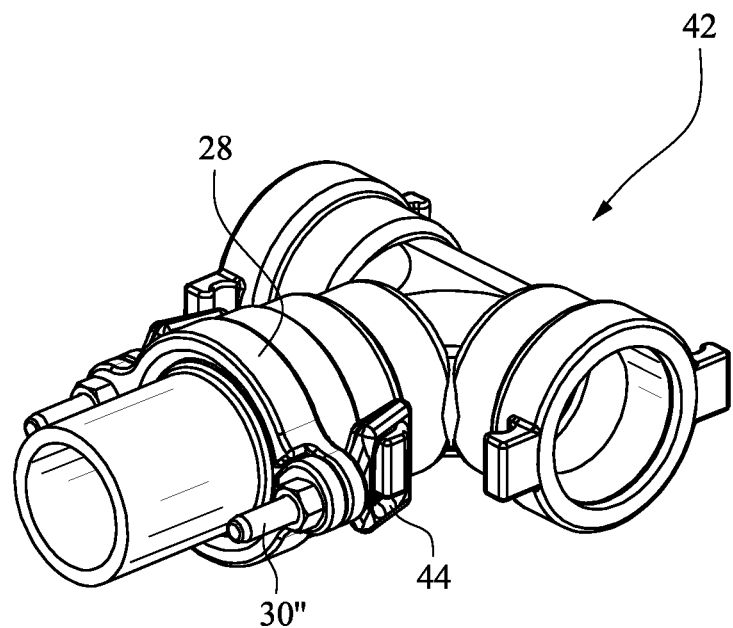

FIGS. 6 and 7 show the push joint adapter 10 and a metallic push joint tee fitting 42. The tee fitting 42 similarly includes a socket with a seal 18' that receives the insertion section 14 of the push joint adapter 10. The tee fitting 42 may be provided with a pair of rod tabs or openings 36' on opposite sides of the socket as shown. In this construction, the restraint rods 30" may include a hook or eyebolt 44 at distal ends thereof that engage the rod tabs or openings 36' of tee fitting 42. The assembly with the modified restraint rods 30", hook or eyebolt 44 and rod tabs or openings 36' shown in FIGS. 6 and 7 may also be applicable to the isolation valve 12, as shown in FIG. 1C.

Figure 8:
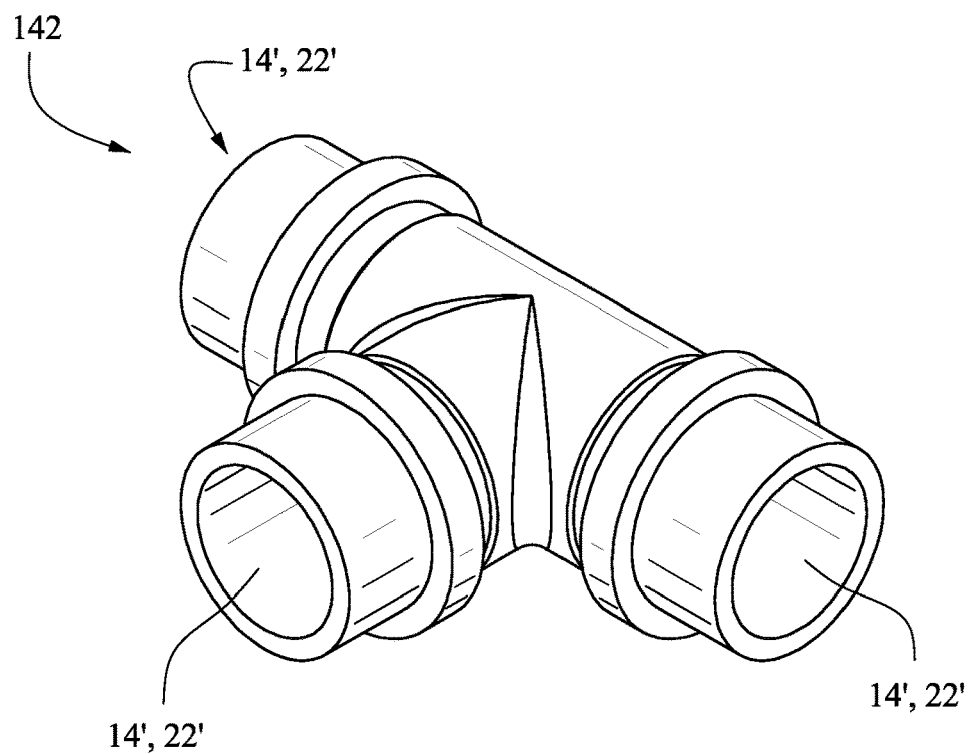
FIG. 8 is a perspective view of a plastic tee fitting incorporating the collar and insertion section on each end.
Figure 9:
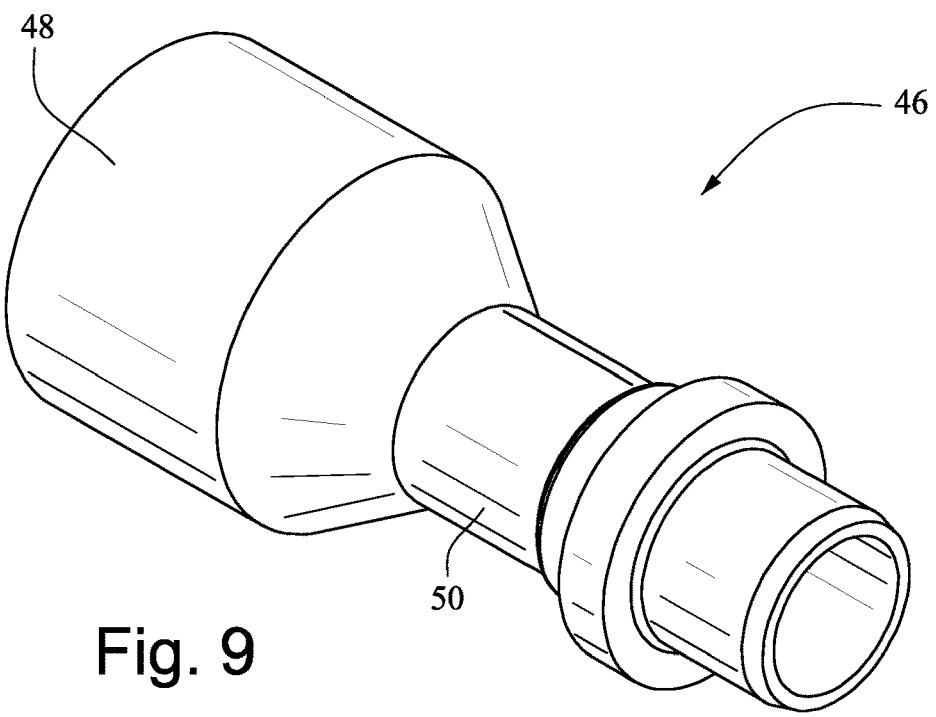
FIG. 9 is a perspective view of a plastic reducer fitting incorporating the collar and insertion section on the smaller end.
Figure 10:
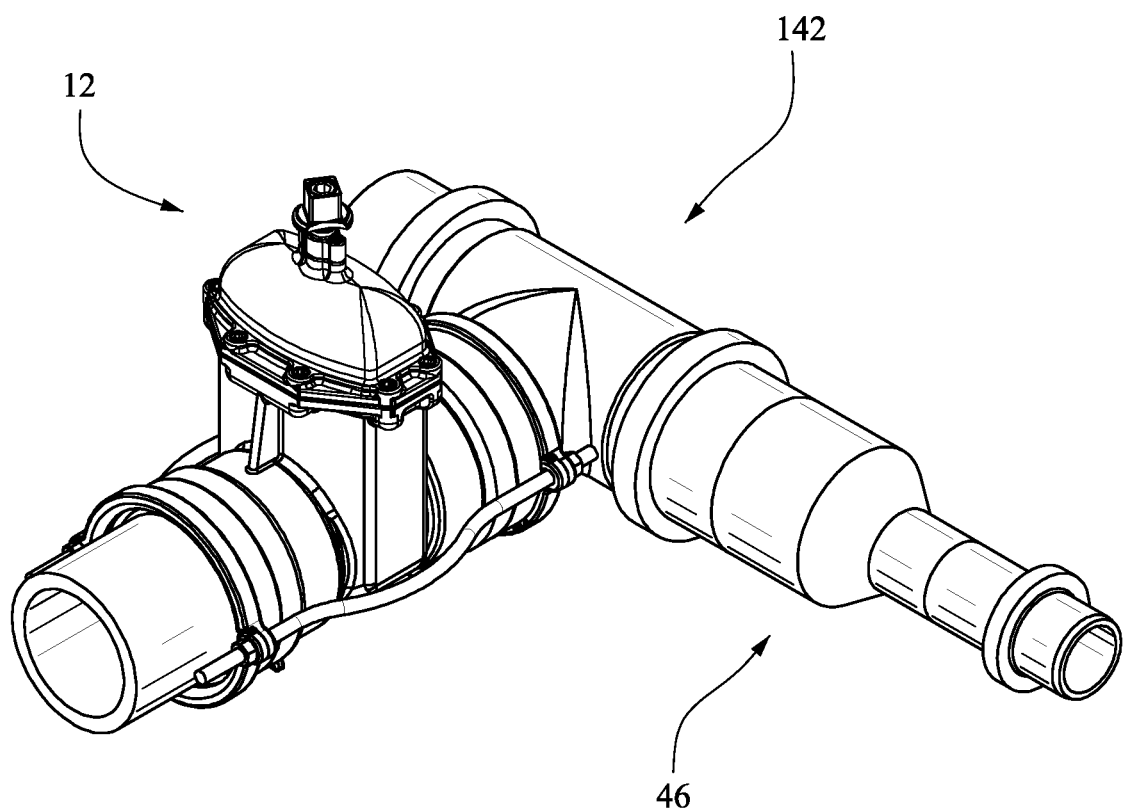
FIG. 10 shows an exemplary combination of the isolation valve, tee fitting and reducer fitting.

FIG. 8 shows a PE tee fitting 142 with ends that may selectively serve as insertion sections 14' or pipeline sections 22' depending on the intended application. That is, each leg of the tee fitting 142 can be either an insertion section 14' or a pipeline section 22' with the same functionality and use as described with respect to the push joint adapter 10 in FIG. 1. As insertion sections 14', .bevels may be provided (e.g., field applied) on the ends to push a valve or push joint fitting on. Alternatively, the insertion ends may be manufactured with bevels, and if a selected insertion end is to be fused to the pipeline, the installer can cut off the bevel. As pipeline sections 22', the insertion ends may be fused directly to the pipeline FIG. 9 shows an application to a PE reducer fitting 46. The reducer fitting 46 is provided with a connecting section 48 connectable to the pipeline section or to another PE fitting and a reduced diameter section 50. FIG. 10 shows an exemplary assembly with the push joint isolation valve 12 connected to the PE tee fitting 142, and the PE reducer fitting 46 connected to the PE tee fitting 142. The PE tee fitting 142 includes one end configured for an application as an insertion section into the isolation valve 12, and one end configured as a pipeline section fused with the PE reducer fitting 46. The open end of the tee fitting 142 could be used as either an insertion section or a pipeline section. The plastic reducers are generally associated with the plastic tees and may be fused to the tees into a resultant tee assembly that has reductions from the "primary" or largest size end of a tee at one or both of the two other ends. This normally happens on one or two of the ends of the "base tee".

Golf and commercial irrigation systems use a lot of isolation valves and have a lot of tees. It is useful to be able to connect them directly to the tees. Current PE products do not allow for this. In the described embodiments, tees and reducers have "collar" features on their ends in order to allow for the direct connection of push joint valves common in the irrigation market. The ends of the tees and reducers would at the same time be fusible directly to other PE fittings or PE pipe. When push joint valves are assembled on to a tee or reducer, its outlet is connected to a PE pipe by means of the push joint adapters described above. The system allows for much easier assembly and installation than the current methods. Fewer parts are required. At least one fusion joint and possibly two fusion joints are eliminated for every valve used. Tees may have as many as three valves, so there can be as many as three to six fusions eliminated. These are also the most difficult fusions to be made in a piping system, those associated with tees. As the diameter goes up, the fusions become more cumbersome. The ability to eliminate fusions at tees is a significant benefit.

With this push joint valve of the described embodiments, valves that are readily available in irrigation distribution can be used effectively, thereby reducing procurement lead times and providing for project fill-ins more readily. Push joint valves are also lower cost than mechanical joint or flanged valves. The installation processes will be less costly than the existing systems because no bolt torqueing is required. The installation process will be less disruptive because it can be accomplished in a matter of one or two hours depending on size, whereas the existing system will require 6 to 12 hours because of the wait time required before re-torqueing.

The system is configured to be universal to all of the various brands of push joint gate valves offering the same universality as those for mechanical joint and flanged valves. The system also provides for connection of ordinary push joint ductile iron pipe fittings with the same benefits enumerated above in lieu of the typical plastic pipe fitting. In the pipe fitting installation, the system makes more straightforward the installation of a fitting into a PE pipeline, which can be difficult and time consuming with the typical PE pipe fitting and butt fusion machine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An assembly for connecting an isolation valve in a polyethylene pipeline, the assembly comprising a first push joint adapter, a second push joint adapter, and the isolation valve, the isolation valve including a first valve socket and a second valve socket, the first push joint adapter comprising:
   a first insertion section insertable into the first valve socket of the isolation valve in an interference fit;
   a first pipeline section connectable with the pipeline;
   a first collar disposed between the first insertion section and the first pipeline section; and
   a first restraint ring assembly including a first restraint ring positioned on the first pipeline section and engaging the first collar and a first restraint rod connected to the first restraint ring,
   the second push joint adapter comprising:
   a second insertion section insertable into the second valve socket of the isolation valve in an interference fit;
   a second pipeline section connectable with the pipeline;
   a second collar disposed between the second insertion section and the second pipeline section; and
   a second restraint ring assembly including a second restraint ring positioned on the second pipeline section and engaging the second collar and a second restraint rod connected to the second restraint ring,
   wherein the first restraint ring of the first push joint adapter is directly connected to the second restraint ring of the second push joint adapter by the first and second restraint rods, wherein the first and second restraint rods include bends therein around the isolation valve such that the first and second restraint rods are non-linear, and wherein the first and second restraint rods are threaded at ends thereof that receive a connector to secure the isolation valve in place.

2. In combination, a push joint adapter connected to a push joint pipe fitting in a pipeline, the combination comprising:
   the push joint pipe fitting including a first socket;
   a pipe fitting collar associated with the push joint pipe fitting;
   a pipe fitting restraint ring engaging the pipe fitting collar; and
   the push joint adapter including:
   an insertion section inserted into the first socket of the push joint pipe fitting in an interference fit,
   a pipeline section connectable with the pipeline,
   an adapter collar disposed between the insertion section and the pipeline section, and
   a restraint ring assembly coupled with the push joint pipe fitting and including an adapter restraint ring positioned on the pipeline section and engaging the adapter collar and a restraint rod connected to the adapter restraint ring at one end and to the pipe fitting restraint ring at an opposite end, wherein the push joint pipe fitting comprises an isolation valve having the first socket and a second socket, the combination comprising two of the push joint adapters respectively secured in the first and second sockets of the isolation valve, wherein the restraint rod includes bends therein around the isolation valve such that the restraint rod is non-linear, and wherein the restraint rod is threaded at ends thereof that receive a connector to secure the isolation valve in place.

3. The combination according to claim 2, wherein the restraint ring assembly includes two restraint rods, and wherein the two restraint rods include bends around the isolation valve.

\* \* \* \* \*